United States Patent Office 3,113,128
Patented Dec. 3, 1963

3,113,128
PROCESS FOR THE MANUFACTURE OF
DIHYDROSTROPHANTHIN
Klaus Repenning, Hamburg-Blankenese, Germany, assignor to Dr. Hommel's Chemische Werke und Handelsgesellschaft m.b.H., Hamburg, Germany
No Drawing. Filed Aug. 18, 1961, Ser. No. 132,302
Claims priority, application Germany Aug. 23, 1960
3 Claims. (Cl. 260—210.5)

The invention relates to a novel process of manufacturing dihydrostrophanthin and, more particularly, to a process wherein all solvent residues are removed from that compound, so that a chemical pure product is obtained.

Strophanthin, also known as ouabain, is a valuable resin-like glycoside which, however, constitutes a powerful poison when administered in too large a dose.

It now has been found that pure dihydrostrophanthin, or dihydroouabain, has the same effect as strophanthin, albeit not as strong, but has more than twice the therapeutical breadth so that administration of an overdose is fully devoid of any danger when, at the like indication, dihydroouabain is given in lieu of ouabain. The range of applicability of this important glycoside thereby is widened considerably.

Dihydroouabain per se is known and had first been prepared by Walter A. Jacobs and Alexander Hofmann, J. Biol. Chem. 74 (1927), page 787ff. These authors prepared that substance by hydrogenation of strophanthin in aqueous solution in the presence of colloidal palladium. After precipitation with ammonium sulfate (by saturation of the aqueous solution, drying of the precipitate and extraction with ethanol), the dihydroouabain could be recovered in amorphous state from the concentrated solution by precipitation with a mixture of ether and petroleum ether. The literature gives a decomposition point of 105° C. The compounds described above, however, are not suited as therapeutics because of their fluctuating degrees of effectiveness and because of their comparatively slight stability. The instant invention is based on the discovery that the substances hitherto described as dihydrostrophanthin or dihydroouabain are not the pure compounds, but are contaminated by considerable quantities of ethanol (as much as 5 to 10 percent) and by traces of ammonium sulfate.

Chemically pure dihydroouabain, according to the invention, is obtained by using in the process of its manufacture, known per se, solvents in lieu of ethanol which can be removed entirely by vacuum drying and/or by reprecipitating the dihydroouabain, contaminated with ethanol, from such solvents before drying. The preferred solvent is methanol. The complete removal of the solvent can be accelerated by using adsorption or absorption agents during vacuum drying.

The compound obtained according to the invention has a melting point of 168–170° C., its specific optical rotation at 20° C. is −45.3° (C—1, 0, D line). The decomposition point is above 170° C.

The invention now will be further illustrated by the following examples. However, it should be understood that these are given merely by way of explanation, not of limitation, and that numerous changes may be made in the details without departing from the spirit and the scope of the invention as hereinafter claimed.

*Example 1*

5 g. ouabain were dissolved in 450 ml. water and hydrogenated, after addition of 0.4 g. colloidal palladium. From the solution thus hydrogenated, the hydroouabain obtained could either be recovered by precipitation with ammonium sulfate or by lyophilisation. The crude product obtained by either method was extracted with absolute methanol. The filtered extract was evaporated to dryness in vacuo, if necessary after decolorization with carbon black. During evaporation, care was taken to maintain the temperature at or below 20° C. The residue was dissolved in 5 ml. absolute methanol, again filtered and precipitated with anhydrous ether. Additional dihydroouabain was recovered from the mother liquor by addition of petroleum ether. The substance was dried in vacuo over $P_2O_5$ and had a melting point of 168° C.

*Example 2*

5 g. ouabain were treated as described in Example 1, but the ammonium sulfate precipitate, or the lyophilisation residue, respectively, was extracted with absolute ethanol in lieu of methanol. The extract then was treated as described in Example 1. The precipitation from methanol with ether and petroleum ether was repeated until the melting point of the product had reached 168° C.

What is claimed is:
1. In a process for the production of chemically pure dihydrostrophanthin by hydrogenation of strophanthin using palladium as a hydrogenation catalyst, isolation of the hydrogenation products thus obtained, extraction of the same with a solvent therefor, precipitation of the dihydrostrophanthin and drying in vacuo, the improvement which comprises carrying out said extraction with anhydrous methanol as a solvent, thereby obtaining a dihydrostrophanthin having a melting point of 168 to 170° C., an optical specific rotation of −45.3° at 20° C., and a decomposition point above 170° C.

2. A process for the production of chemically pure dihydrostrophanthin having a melting point of 168 to 170° C., an optical specific rotation of −45.3° at 20° C., and a decomposition point above 170° C., which comprises hydrogenating strophanthin in aqueous solution using palladium as a catalyst, recovering the crude hydrostrophanthin thus obtained, extracting the same with absolute methanol, filtering, evaporating the filtrate in vacuo to dryness, redissolving in absolute methanol, filtering, and precipitating the dihydrostrophanthin with anhydrous ether; adding petroleum ether to the remaining mother liquor thus precipitating additional dihydrostrophanthin therefrom, and isolating the same; combining the precipitates of dihydrostrophanthin thus obtained and drying the same in vacuo.

3. The process as defined in claim 2, wherein vacuum drying is accelerated by the simultaneous use of absorption agents.

References Cited in the file of this patent
Chem. Abst., volume 35, 1408[6] and 1408[7].
J. Biol. Chem. 74 (1927), page 787ff, by Jacobs et al.
J. Pharmacol., Exptl. Therap. 121, 330–9, by Vick et al. (1957).